(12) United States Patent
Lee et al.

(10) Patent No.: US 9,008,995 B2
(45) Date of Patent: *Apr. 14, 2015

(54) ACTIVITY DETECTION IN MEMS ACCELEROMETERS

(75) Inventors: James M. Lee, Northborough, MA (US); John Memishian, Weston, MA (US)

(73) Assignee: Analog Devices, Inc., Norwood, MA (US)

( * ) Notice: Subject to any disclaimer, the term of this patent is extended or adjusted under 35 U.S.C. 154(b) by 454 days.

This patent is subject to a terminal disclaimer.

(21) Appl. No.: 13/489,784

(22) Filed: Jun. 6, 2012

(65) Prior Publication Data

US 2012/0279304 A1 Nov. 8, 2012

Related U.S. Application Data

(63) Continuation-in-part of application No. 12/408,536, filed on Mar. 20, 2009, now Pat. No. 8,220,329, which is a continuation-in-part of application No. 12/408,540, filed on Mar. 20, 2009, now Pat. No.

(Continued)

(51) Int. Cl.
*G01P 15/00* (2006.01)
*G01P 21/00* (2006.01)

(Continued)

(52) U.S. Cl.
CPC .............. *G01P 15/18* (2013.01); *G01P 1/127* (2013.01); *G01P 15/0891* (2013.01)

(58) Field of Classification Search
USPC ............... 73/1.37–1.38, 1.77, 1.79, 488, 492, 73/503, 503.3, 510–511, 514.01, 514.32
See application file for complete search history.

(56) References Cited

U.S. PATENT DOCUMENTS

| 4,638,289 A | 1/1987 | Zottnik .................. 340/52 H |
| 4,862,394 A | 8/1989 | Thompson et al. ...... 364/551.01 |

(Continued)

FOREIGN PATENT DOCUMENTS

| EP | 1643501 A2 | 4/2006 | ............. B29C 33/56 |
| EP | 1 850 138 A1 | 10/2007 | ............. G01P 15/00 |

(Continued)

OTHER PUBLICATIONS

Hollocher et al., A Very Low Cost, 3-Axis, MEMS Accelerometer for Consumer Applications, IEEE Sensors 2009 Conference, pp. 953-957.*

(Continued)

*Primary Examiner* — Toan Le
(74) *Attorney, Agent, or Firm* — Sunstein Kann Murphy & Timbers LLP (57) ABSTRACT

A method of detecting activity with a MEMS accelerometer stores a value of acceleration, then measures acceleration at a later time, calculates a change in acceleration using the measured acceleration and the stored acceleration, and compares the change in acceleration to an activity threshold to detect activity. A method of detecting inactivity uses a similar technique along with a timer. The method of detecting inactivity with a MEMS accelerometer stores an acceleration value, then measures acceleration at a later time, calculates a change in acceleration using the measured acceleration and the stored acceleration, and compares the change in acceleration to an inactivity threshold. If the change in acceleration is less than the inactivity threshold and, if a predetermined period of time has elapsed, then inactivity is detected.

16 Claims, 6 Drawing Sheets

Related U.S. Application Data 8,239,160.

(60) Provisional application No. 61/038,594, filed on Mar. 21, 2008, provisional application No. 61/049,590, filed on May 1, 2008, provisional application No. 61/078,923, filed on Jul. 8, 2008.

(51) Int. Cl.
*G01P 15/18* (2013.01)
*G01P 1/12* (2006.01)
*G01P 15/08* (2006.01)

(56) References Cited

U.S. PATENT DOCUMENTS

| | | | |
|---|---|---|---|
| 5,388,247 A | 2/1995 | Goodwin et al. | 395/425 |
| 6,434,642 B1 | 8/2002 | Camilleri et al. | 710/57 |
| 7,084,762 B2 | 8/2006 | Pedrazzini et al. | 340/545.5 |
| 7,205,173 B2 | 4/2007 | Brunson et al. | 438/48 |
| 7,212,944 B1 | 5/2007 | Kohler et al. | 702/145 |
| 7,350,424 B2 | 4/2008 | Hjelt et al. | 73/862.041 |
| 7,409,291 B2 | 8/2008 | Pasolini et al. | 701/220 |
| 8,217,795 B2 | 7/2012 | Carlton-Foss | 340/573.1 |
| 8,220,329 B2 | 7/2012 | Lee | 73/514.01 |
| 8,239,160 B2 * | 8/2012 | Lee et al. | 702/141 |
| 2001/0008577 A1 | 7/2001 | Yamada et al. | 386/98 |
| 2004/0172167 A1 | 9/2004 | Pasolini et al. | 700/245 |
| 2005/0212912 A1 | 9/2005 | Huster | 348/155 |
| 2005/0216867 A1 | 9/2005 | Marvit et al. | 715/863 |
| 2006/0184336 A1 | 8/2006 | Kolen | 702/150 |
| 2007/0169551 A1 | 7/2007 | Kelly | 73/514.01 |
| 2007/0192055 A1 | 8/2007 | Tsujino et al. | 702/150 |
| 2007/0245826 A1 | 10/2007 | Cardarelli | 73/504.12 |
| 2007/0255531 A1 | 11/2007 | Drew | 702/189 |
| 2007/0257885 A1 | 11/2007 | Liberty | 345/158 |
| 2007/0273463 A1 | 11/2007 | Yazdi | 335/78 |
| 2007/0296571 A1 | 12/2007 | Kolen | 340/539.11 |
| 2008/0016961 A1 | 1/2008 | Dwyer et al. | 73/504.02 |
| 2008/0190198 A1 | 8/2008 | Prandi et al. | 73/504.12 |
| 2008/0190199 A1 | 8/2008 | Prandi et al. | 73/504.12 |
| 2008/0190200 A1 | 8/2008 | Caminada et al. | 73/504.12 |
| 2008/0252445 A1 | 10/2008 | Kolen | 340/539.16 |
| 2009/0002345 A1 | 1/2009 | Burstrom | 345/179 |
| 2009/0007661 A1 | 1/2009 | Nasiri et al. | 73/504.03 |
| 2009/0012748 A1 | 1/2009 | Beish et al. | 702/187 |
| 2009/0019932 A1 | 1/2009 | Cardarelli | 73/504.02 |
| 2009/0076765 A1 | 3/2009 | Kulach et al. | 702/141 |
| 2009/0293615 A1 | 12/2009 | Lee | 73/514.01 |

FOREIGN PATENT DOCUMENTS

| | | | | |
|---|---|---|---|---|
| JP | 2002-174641 A | 6/2002 | | G01P 15/00 |
| JP | P2002-174641 A | 6/2002 | | G01P 15/135 |
| JP | 2005 241503 | 9/2005 | | G01P 15/00 |
| WO | WO 2006 122246 A2 | 11/2006 | | G01P 15/08 |
| WO | WO 2009/117703 A1 | 9/2009 | | G01P 15/08 |

OTHER PUBLICATIONS

European Patent Office, Authorized Officer, Robinson, Mark, International Search Report and Written Opinion dated Aug. 19, 2013, International Application PCT/US2013/043988, 92 pages.
Ermolov, et al., "Microsystem Technologies for Mobile Communication Products," Nokia Research Center, 2001, 7 pages.
Price, et al., "A Secure Key Management Scheme for Sensor Networks." Proceedings of the Tenth Americas Conference on Information Systems, 2004, pp. 1739-1745.
Bouchaud, MEMS Market Brief, iSuppli, May 2009, pp. 1-17.
International Searching Authority, International Search Report dated Jul. 3, 2009, International Application No. PCT/US2009/037879, 10 pages.
Analog Devices, Inc., "The Five Motion Senses: Using MEMS Inertial Sensing to Transform Application," http://www.analog.com/en/mems/high-g-accelerometers/products/overview/over‾Five‾Motion‾Senses/resources/fca.html, retrieved Jul. 23, 2009, 3 pages.
International Searching Authority, International Search Report and Written Opinion, Application No. PCT/US2009/037852, dated Feb. 12, 2010, 9 pages.
Lei Fang et al., "Design of a Wireless Assisted Pedestrian Dead Reckoning System—The NavMote Experience", IEEE Transactions of Instrumentation and Measurement, vol. 54, No. 6, Dec. 2005, pp. 2342-2358.
Texas Instruments, "2048 X 9 Strobed First-In, First-Out Memory", SCAS205E, Nov. 2001 (Revised), 18 pages.

* cited by examiner

ACTIVITY DETECTION IN MEMS ACCELEROMETERS

CROSS-REFERENCE TO RELATED APPLICATIONS

This patent application is a continuation-in-part of U.S. patent application Ser. No. 12/408,536, filed Mar. 20, 2009, now allowed, entitled MANAGEMENT SYSTEM FOR MEMS INERTIAL SENSORS and is a continuation-in-part of U.S. patent application Ser. No. 12/408,540, filed Mar. 20, 2009, now allowed, entitled ACTIVITY DETECTION IN MEMS ACCELEROMETERS.

This patent application also claims priority to U.S. Provisional Patent Application No. 61/038,594 filed Mar. 21, 2008, entitled ACTIVITY DETECTION IN MEMS ACCELEROMETERS, U.S. Provisional Patent Application No. 61/049,590 filed May 1, 2008, entitled MANAGEMENT SYSTEM AND METHOD FOR MEMS INERTIAL SENSORS, and U.S. Provisional Patent Application No. 61/078,923 filed Jul. 8, 2008, entitled SYSTEM AND METHOD FOR CAPTURING AN EVENT IN MEMS INERTIAL SENSORS. The disclosure of each of the above named applications is incorporated by reference herein in their entirety.

This patent application is also related to U.S. patent application Ser. No. 12/408,532, entitled SYSTEM AND METHOD FOR CAPTURING AN EVENT IN MEMS INERTIAL SENSORS filed Mar. 20, 2009, the disclosure of which is incorporated by reference herein in its entirety.

FIELD OF THE INVENTION

The invention generally relates to MEMS accelerometers and, more particularly, the invention relates to detecting activity or inactivity in MEMS accelerometers.

BACKGROUND OF THE INVENTION

A variety of different applications use sensor systems to detect the movement of an underlying object. Sensors employing microelectromechanical systems (MEMS) devices are increasingly used in such applications due to their relatively small size and their capability to detect relatively small changes in the measured item. MEMS devices, such as an accelerometer, typically employ a movable, inertial mass formed with one or more fixed, non-moving structures. For example, in a MEMS accelerometer, the inertial mass may be suspended in a plane above a substrate and movable with respect to the substrate. The movable structure and the fixed structures form a capacitor having a capacitance that changes when the movable structure moves relative to the fixed structures in response to applied forces, such as along a predetermined axis of the device, e.g., x-, y- and z-axes.

Currently, accelerometers may be used for monitoring the interaction of users with electronic devices, such as gaming devices, cell phones, personal digital assistants, etc. The accelerometer in the devices may detect a movement above a particular threshold or a change in orientation. However, accelerometers experience a constant 1 g field due to the earth's gravitational field. This 1 g field is in an arbitrary direction depending upon the orientation of the device. In order to find the actual acceleration of an object (relative to the earth), a 1 g threshold is typically set in the device in order to eliminate the contribution from the earth's gravitational field. This means, however, that a device typically can only detection acceleration greater than 1 g. High pass filters may be used in an attempt to compensate for this shortcoming, but this solution does not detect extremely slow interactions. In some cases, however, users move electronic devices in a slow manner and do not cause greater than a 1 g change. Other problems with monitoring the interaction of users with electronic devices is determining when users stop moving the device. The device may not be placed in a known orientation so detecting inactivity has some similar challenges as detecting movement or activity of the device.

SUMMARY OF THE INVENTION

In accordance with one embodiment of the invention, a method of detecting activity with a MEMS accelerometer captures and stores an acceleration value, measures acceleration at a later predetermined time, calculates a change in acceleration using the measured acceleration and the stored acceleration value, and compares the change in acceleration to a threshold to detect activity.

In some embodiments of the invention, detecting activity requires determining if the change of acceleration exceeds the activity threshold at a plurality of intervals and only declaring that activity is detected if the change of acceleration exceeds the threshold during each interval.

In accordance with another embodiment of the invention, a method of detecting inactivity with a MEMS accelerometer captures and stores an acceleration value, then measures acceleration at a later predetermined time, calculates a change in acceleration using the measured acceleration and the stored acceleration, and compares the change in acceleration to an inactivity threshold. The process further determines if the change in acceleration is less than the inactivity threshold and, if so, determines if a predetermined period of time has elapsed to detect inactivity.

The method of detecting activity and inactivity can be realized using circuitry implemented as an integrated circuit including an output pin that signals activity. This output pin is configured to present a first electrical value when the last state detected is activity and to present a second electrical value when the last state detected is inactivity.

In some embodiments, the method may further include changing the predetermined time for measuring acceleration when activity or inactivity is detected. The MEMS accelerometer may include at least one measurement axis and measuring acceleration may include measuring acceleration from one or more measurement axes. In addition, or alternatively, the threshold may be a different value for two or more measurement axes or may be the same value for two or more measurement axes. Activity may be detected if the change in acceleration is greater than or equal to the threshold for any measurement axis. In contrast, inactivity is detected if the change in acceleration is less than the threshold for all measurement axes. The method may further include initiating a method of detecting inactivity once activity is detected or vice versa. The threshold for detecting activity may be a different value than the threshold for detecting inactivity for a given measurement axis.

For inactivity detection, if the change in acceleration is greater than or equal to the threshold, the method may further repeat capturing, measuring, calculating and comparing until the change in acceleration is less than the threshold. If the predetermined period of time has not elapsed, the method may further repeat measuring, calculating, comparing, and determining if the change in acceleration is less than the threshold until the predetermined period of time has elapsed or the change in acceleration is greater than or equal to the threshold.

Illustrative embodiments of the invention may be implemented as a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

Embodiments of the present invention provide a system and method of detecting activity or inactivity in a MEMS accelerometer. For activity detection, the process may capture an acceleration offset or bias upon the start of looking for activity. This bias is taken and stored. The accelerometer may measure a current acceleration at a data rate and compare the measured acceleration to the acceleration bias to look for a difference greater than an activity threshold. For inactivity detection, a similar technique may be used along with a timer. When inactivity detection is desired, the measured acceleration data is compared to the stored acceleration bias. The process continues until the change in acceleration is less than the inactivity threshold for a desired period of time. In some embodiments of the invention, a desired period of time can be measured by a specified number of samples taken at a given sampling rate. Embodiments of the present invention provide a way of monitoring activity and/or inactivity and detecting when it changes, and even in the presence of a constant acceleration such as the earth's 1 g. gravitational field and even when the change in acceleration or orientation is less than 1 g. The activity/inactivity monitoring and detection may be performed by a sensor management system that uses digital logic and state machines. The sensor management system may be coupled with one or more sensors to effectively manage different conditions of a device containing the sensor(s) without interaction with the device's central computer or microprocessor (excluding the sensor's interaction with the microprocessor during its initial configuration). For instance, the inertial sensor does receive some initial input from the microprocessor, such as initial configurations or settings, e.g., threshold values, which may be set manually by a user or automatically. In this way, the sensor management system coordinates the sensor's functions and responds to specific types of detected movement. By embedding the functionality in the sensor management system, benefits may be realized, such as achieving maximal power savings since only the sensor and the sensor management system may need to be powered, rather than the device's microprocessor. Thus, the activity/inactivity monitoring and detection capability may provide efficient management of a MEMS inertial sensor. Details of illustrative embodiments are discussed below. Note that the term "dynamic component of acceleration" in the following description and any appended claims, unless context requires otherwise, shall mean the total measured acceleration minus any static component of acceleration, e.g., gravity.

Figure 1:
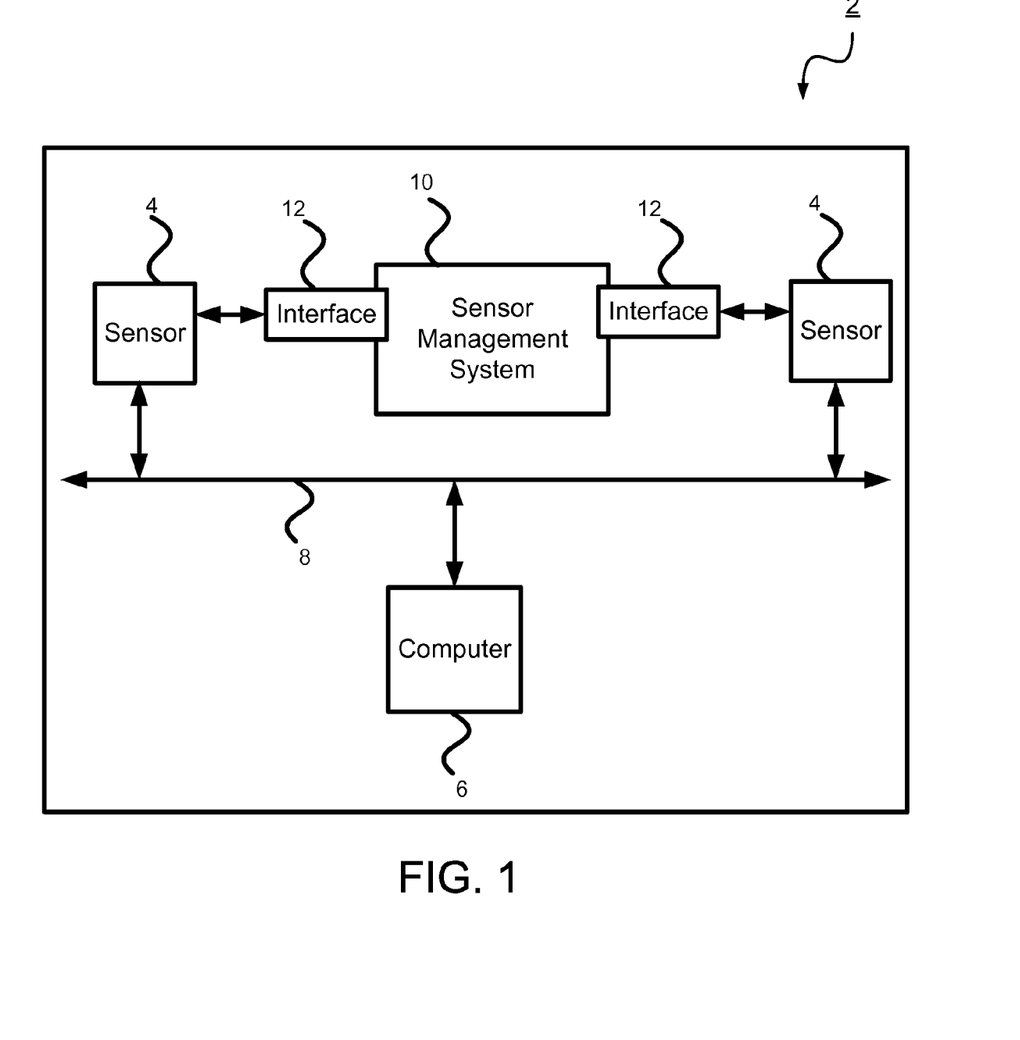
FIG. 1 schematically shows a simplified view of a sensor system in accordance with illustrative embodiments of the invention.

As shown in FIG. 1, various embodiments may include a sensor system 2 having one or more inertial sensors 4 that communicate with a central computer or microprocessor 6 through some interconnection medium 8. The sensor system 2 may also include one or more sensor management systems 10 in communication with the inertial sensor(s) 4. The inertial sensor(s) 4 may produce data values, e.g., motion data related to the detected movement of an object, which may be transmitted to the microprocessor 6 via interconnection 8 and/or the sensor management system 10 through the management system's interface 12, as discussed in more detail below. Although FIG. 1 shows two inertial sensors 4 with one management system 10, one sensor 4 may be used with one or more management systems 10 and/or two or more inertial sensors 4 may be used with one or more management systems 10.

Figure 2:
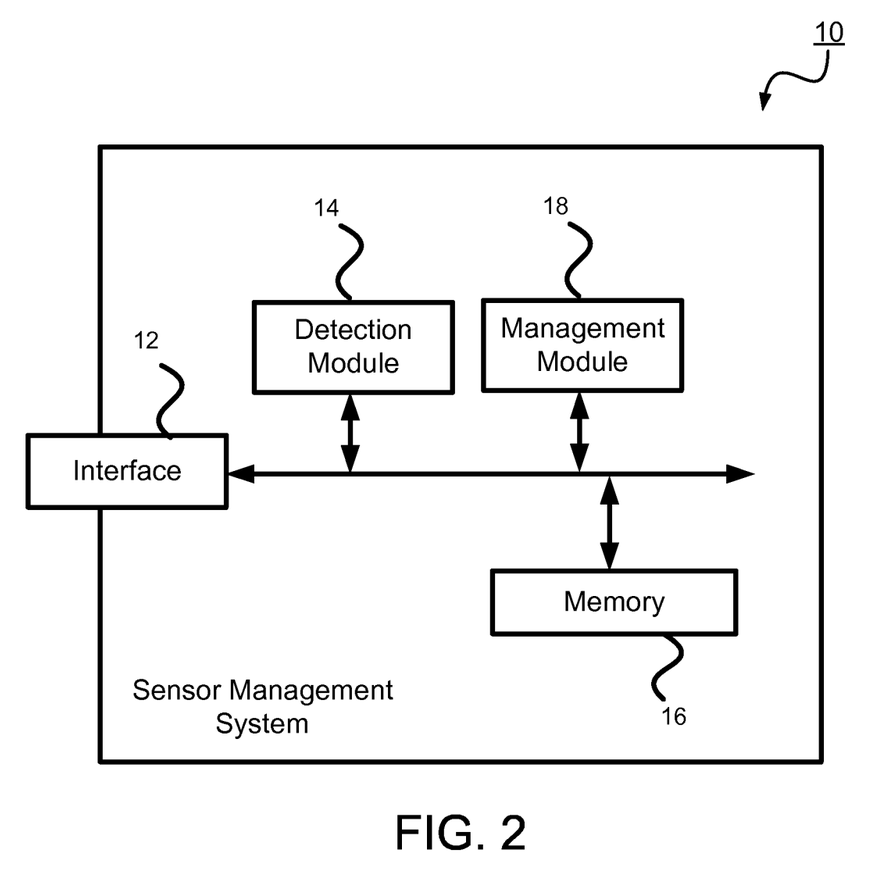
FIG. 2 schematically shows a sensor management system in accordance with illustrative embodiments of the invention.

FIG. 2 schematically shows a block diagram of a sensor management system 10 in accordance with illustrative embodiments of the invention. The sensor management system 10 may include an interface 12 for communicating with external devices, such as the inertial sensor(s) 4 (e.g., for receiving data produced by the sensors and sending data to the sensors) or the microprocessor 6, and a detection module 14 for processing the data values received and monitoring or determining whether activity and/or inactivity has occurred. The sensor management system 10 may also include memory 16 for storing or collecting the data values received from the external device and the data values calculated by the detection module 14.

The sensor management system 10 may also include a management module 18 that may modify the sensor's configuration. Various parameters may be set in the sensor 4 by the management module 18, e.g., parameters may be set based on whether activity or inactivity is detected by the detection module 14. In some embodiments, for example, the rate the acceleration is measured from the accelerometer may vary depending upon whether activity or inactivity is detected. For instance, a more frequent sample rate may be used by the sensor 4 when activity is detected or monitored by the detection module 14 rather than when inactivity is detected or monitored. In addition, or alternatively, the management module 18 may coordinate the functionality of the detection module 14. For example, in some embodiments, it may be desirable to look for activity after inactivity is detected and vise-versa. Thus, the management module 18 may instruct the detection module 14 when to look for activity and/or inactivity. By coordinating the activity detection and inactivity detection functions in the detection module 14, intelligent management of the accelerometer functions may be achieved, e.g., effective automated power management. The functionality of the sensor management system 10 and its detection module 14 are discussed in greater detail below with regard to embodiments of its implementation.

Figure 3:
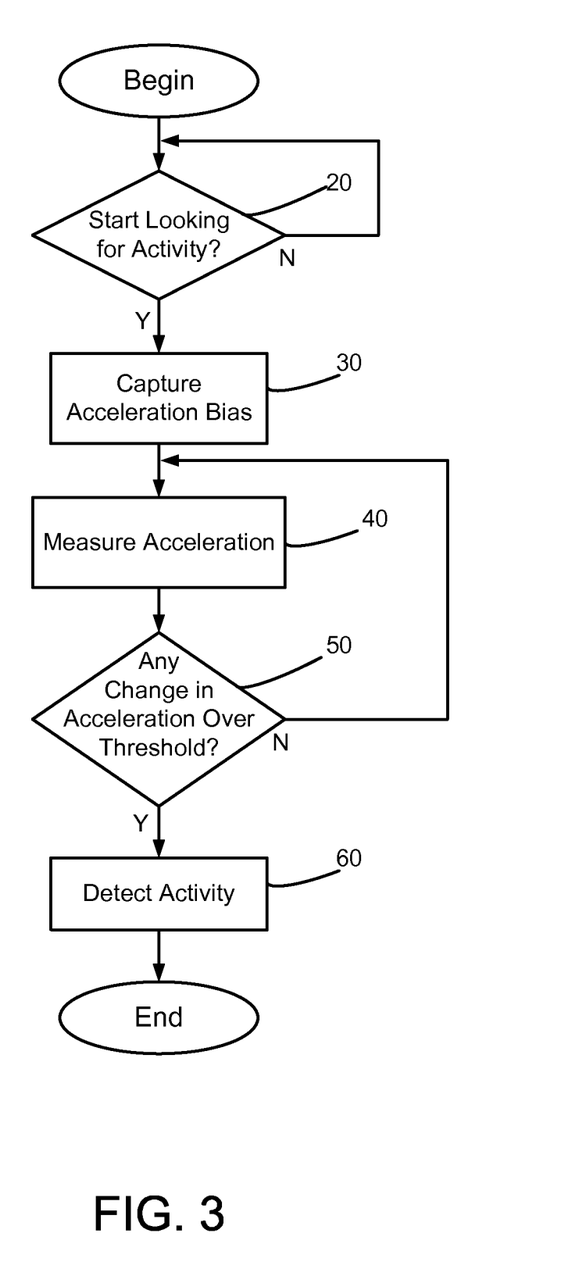
FIG. 3 shows a process of detecting activity in a MEMS accelerometer according to embodiments of the present invention.

FIG. 3 shows a process of detecting activity that may be performed by the sensor management system's 10 detection module 14 according to illustrative embodiments of the present invention. Thus, in some embodiments, the detection module 14 may include a computational component and a comparator (not shown) as discussed further below. The process begins at step 20, which decides whether to start looking for activity. The detection module 14 may start to look for activity automatically at designated times, (e.g., when the device is turned on or at periodic intervals) or manually, (e.g., when the user actively initiates a request such as tapping on a device screen). Alternatively, or in addition, the management module 18 may instruct the detection module 14 to start to look for activity once inactivity is detected (inactivity detection is discussed in greater detail below with regard to FIG. 4).

In step 30, an acceleration offset or bias may be captured upon the start of looking for activity. This may be accomplished by having the detection module 14 capture a snapshot of the current acceleration or orientation of the device and digitally store the value as the acceleration bias in memory 16.

In step 40, the acceleration of the device may be measured by the sensor(s) 4 and the data values stored in memory 16. The acceleration may be measured on one or more axes of the device (e.g., x-, y-, and/or z-axis), which may be determined automatically or manually (e.g., set by the user). The accelerometer may sample the acceleration data at a data rate. The management module 18 may determine the sensor's 4 data rate depending on the current detected state of the device by the detection module 14. For example, the accelerometer sample rate may be set to a desired "awake" mode or more frequent sampling rate when activity is detected or monitored by the detection module 14. Similarly, the accelerometer sample rate may be set to a desired "sleep" mode or more infrequent sampling rate when inactivity is detected/monitored. When the detection module 14 has yet to determine activity and/or inactivity, the management module 18 may set a default value for the sensor's 4 sample rate, e.g., sleep mode sampling rate, awake mode sampling rate, or some other sampling rate, until the detection module 14 determines the current detected state of the device. Although one mode is discussed for when activity or inactivity is detected/monitored, the management module 18 may set two or more different modes during a given state of the device.

In step 50, the detection module 14 calculates the change in acceleration and verifies whether that change is greater than or equal to a threshold. The detection module 14 may determine the change in acceleration by calculating the difference between the current measured acceleration and the digitally stored acceleration bias using a computational component. The detection module 14 may then compare an absolute value of the change in acceleration to a threshold value using a comparator. The detection module 14 performs these calculations and the measured acceleration values, the calculated difference and the threshold value may be stored in the memory 16. The threshold may be set automatically or manually and may be the same or different for different axes. If the change in acceleration is less than the threshold, then the process returns to step 40 where the acceleration may be measured again. If the change in acceleration is greater than or equal to the threshold, then the process proceeds to step 60, where activity is detected. When activity is detected by the detection module 14, it may inform the management module 18 of the current detected state of the device. The management module 18 may then send instructions or parameters to the inertial sensor 4 via the interface 12 as discussed above (e.g., setting sampling rates), and may send instructions back to the detection module 14, e.g., start to look for inactivity. Thus, the detection module 14 may optionally start to look for inactivity once activity is detected.

Figure 4:
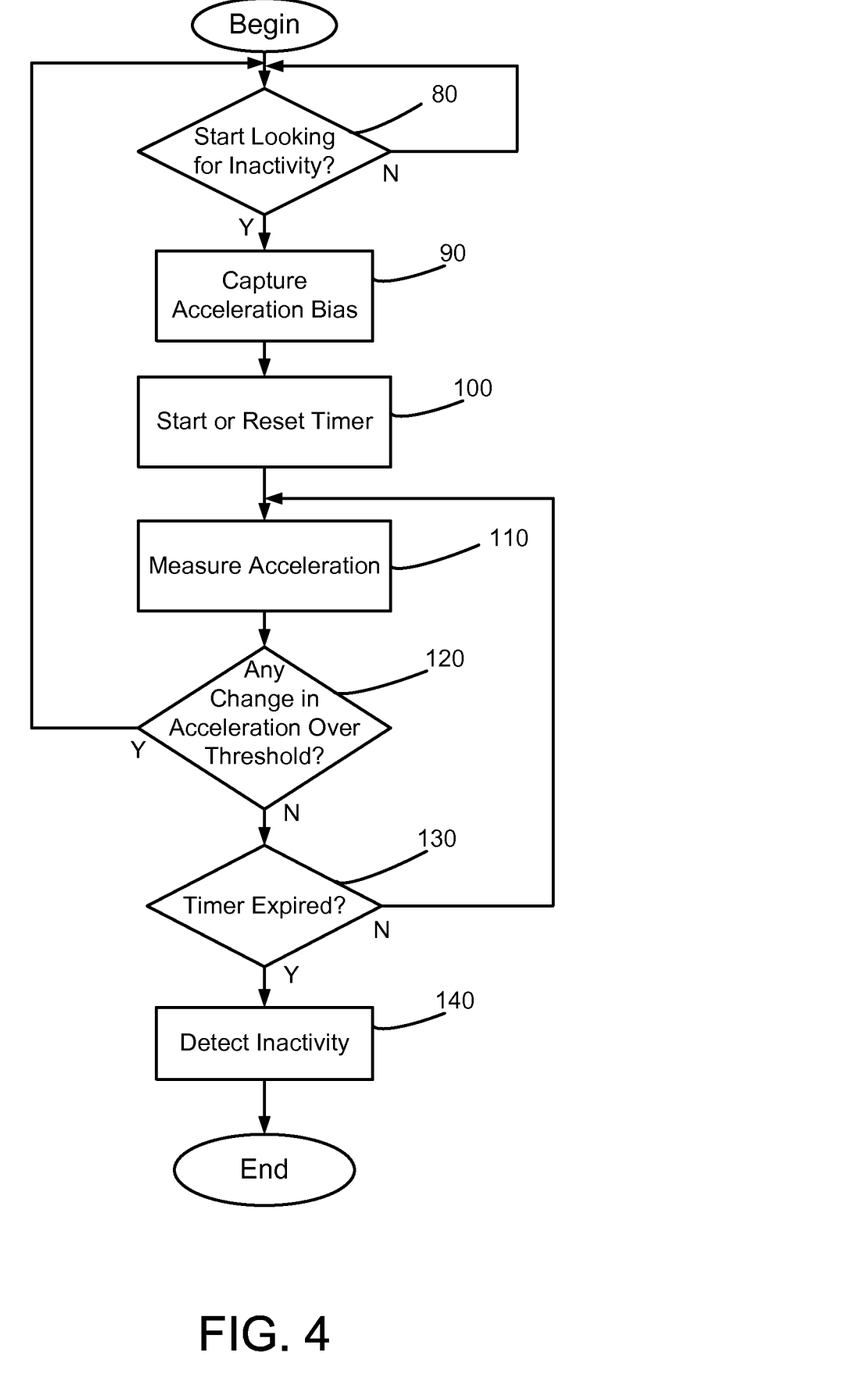
FIG. 4 shows a process of detecting inactivity in a MEMS accelerometer according to embodiments of the present invention.

FIG. 4 shows a process of detecting inactivity that may be performed by the sensor management system's 10 detection module 14 according to illustrative embodiments of the present invention. Inactivity detection is similar to activity detection although a timer may be used. Thus, in some embodiments, the detection module 14 may include a timer along with the computational component and comparator (not shown). The process begins at step 80, which decides whether to start looking for inactivity. The detection module 14 may start to look for inactivity automatically at designated times, (e.g., when the device is turned off or at periodic intervals) or manually, (e.g., when the user actively initiates a request such as tapping on a device screen). Alternatively, or in addition, the management module 18 may instruct the detection module 14 to start to look for inactivity once activity is detected.

In step 90, an acceleration offset or bias may be captured by the detection module 14 upon the start of looking for inactivity. This step is similar to step 30 in the activity detection process described above. In step 100, the detection module's 14 timer may be started or reset. In step 110, the acceleration of the device may be measured, similar to step 40 described above.

In step 120, the detection module 14 calculates the change in acceleration and verifies whether that change is greater than or equal to a threshold, similar to step 50 described above. The threshold may be set automatically or manually and may be the same or different for different axes. The inactivity threshold may also be the same or different than the activity threshold. If the change in acceleration is greater than or equal to the given threshold in any of the measured axes, then the process returns back to step 80. If the change in acceleration is less than the given threshold for all of the measured axes, then the process proceeds to step 130.

In step 130, the detection module 14 verifies whether a predetermined period of time has elapsed, e.g., by determining whether the timer has expired. If the timer has not expired, then the process returns to step 110 and the acceleration may be measured again. If the timer has expired, then the process proceeds to step 140, where inactivity is detected. The predetermined period of time may be set automatically or manually. When inactivity is detected by the detection module 14, it may inform the management module 18 of the current detected state of the device. The management module 18 may then send instructions or parameters to the inertial sensor 4 via the interface 12 as discussed above (e.g., setting sampling rate parameters), and may send instructions back to the detection module 14, e.g., start to look for activity. Thus, the detection module 14 may optionally start to look for activity once inactivity is detected.

As mentioned above, various parameters may be set in the inertial sensor 4 by the management module 18. Although the sampling rate parameter is mentioned above, discussion of a specific parameter is exemplary and not intended to limit the scope of various embodiments of the invention. Other parameters in the inertial sensor(s) 4 may also be set by the management module 18 as known by those skilled in the art. In addition, the management module 18 may set parameters in the detection module 14, the memory 16, and/or the sensor(s) 4.

Although inertial sensors 4 such as accelerometers are discussed above, principles of illustrative embodiments may apply to other inertial sensors or sensor devices, such as MEMS gyroscopes and MEMS pressure sensors or microphones. Accordingly, discussion of inertial sensors is exemplary and not intended to limit the scope of various embodiments of the invention.

Among other implementations, the detection module 14 and the management module 18 may be a single integrated unit having the discussed functionality, and/or a plurality of interconnected, separate functional devices. Reference to a "module" therefore is for convenience and not intended to limit its implementation. Moreover, the various functionalities within the detection module 14 and/or the management module 18 may be implemented in any number of ways, such as by means of one or more application specific integrated circuits or digital signal processors, or the discussed functionality may be implemented in software.

In some embodiments of the present invention, activity and inactivity detection may be determined independently of one another and/or concurrently. In some embodiments, activity detection may be dependent upon detecting inactivity and vise-versa. As mentioned above, the start of looking for activity (step 20) may be based on having detected inactivity and the start of looking for inactivity (step 80) may be triggered by having detected activity. For example, once inactivity is detected, the sample rate of the sensor 4 may be slowed to a "sleep" rate to further reduce power consumption.

The activity and inactivity functions may be embedded in the accelerometer for power control of the end device. This may be accomplished by using digital logic and state machines closely embedded with the accelerometer. Alternatively, the activity and inactivity functions may exist separately and a microprocessor or other controller may configure the sensor to look for activity, inactivity or both.

All or part of the functionality of the sensor management system 10 may be implemented in management circuitry, which may be implemented as part of the sensor-specific circuitry. For example, if the sensor is an accelerometer, then all or part of its functionality may be integrated with the accelerometer or sensor circuitry. The sensor circuitry may detect an acceleration above a particular threshold or a change in orientation and transmit such motion data to other circuitry for further processing. Sensor specific circuitry may be on the same chip or die as the sensor itself, or on a different chip or die. As another example, the sensor specific circuitry may be implemented on an application specific integrated circuit (ASIC), while the sensor may be on a sensor chip with no circuitry (other than pads for wirebonding with the ASIC). Both the ASIC and sensor chip may be within a single package, or in separate packages.

In specific embodiments of the invention, the sensor management system 10 of FIG. 1 and one or more sensors 4 may be implemented within a single package, i.e., an integrated circuit. An output pin of this integrated circuit may be configured to present a first electrical value when the last state detected by the sensor management system is activity and a second electrical value when the last state detected by the sensor management system is inactivity. This activity/inactivity output may then be connected, for example, to a power switch. In illustrative devices, the power switch could turn on a light or activate cell phone circuitry or turn on a wireless radio, etc., when the output pin signals the activity state and power down these functions when the output pin signals the inactivity state. Thus, power savings leading to extended battery life may be realized. In some embodiments, the sensor management system coupled with the activity/inactivity output pin may employ the activity/inactivity algorithms shown in FIGS. 3 and 4. In other embodiments, alternative activity/inactivity algorithms may be employed. One alternative approach to activity/inactivity detection is disclosed in U.S. Pat. No. 7,409,291 to Pasolini, entitled "DEVICE FOR AUTOMATIC DETECTION OF STATES OF MOTION AND REST, AND PORTABLE ELECTRONIC APPARATUS INCORPORATING IT," which is incorporated by reference herein in its entirety.

Figure 5:
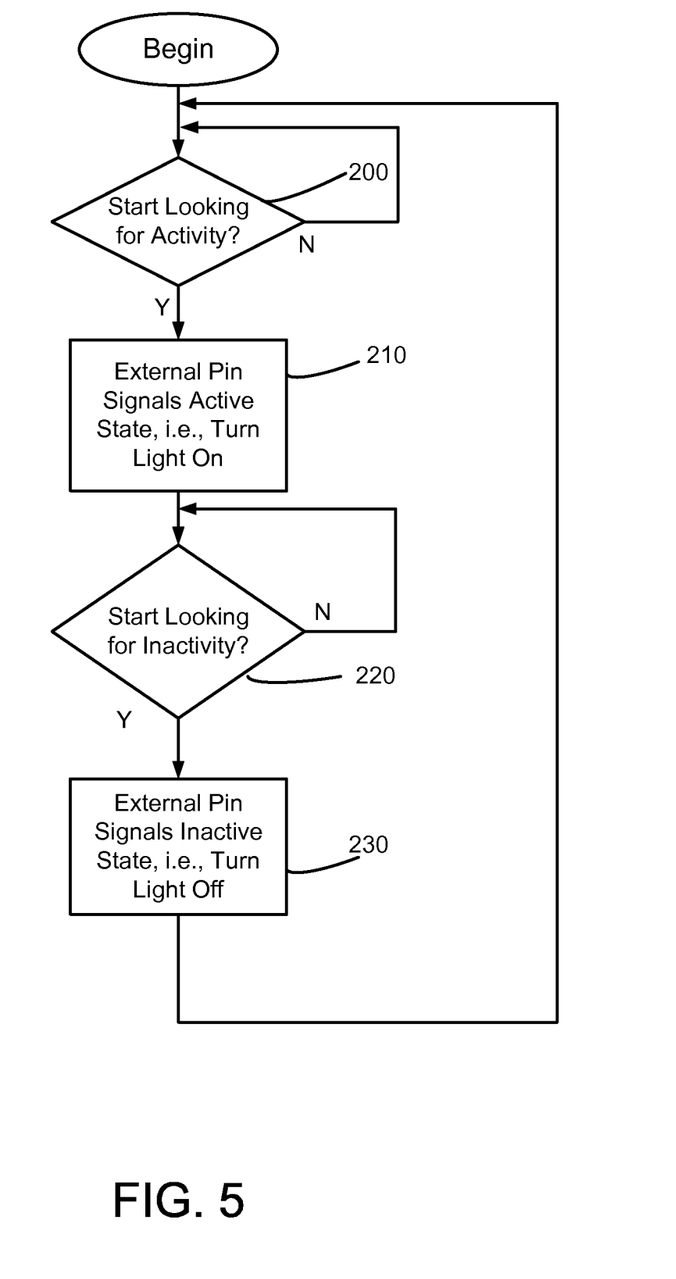
FIG. 5 shows a process of detecting activity and inactivity with a MEMS accelerometer and using the activity/inactivity status to switch an external device, according to another embodiment of the invention

FIG. 5 shows a flow diagram illustrating the embodiment of the invention described in the preceding paragraph. The sensor management system 10 initially searches for activity 200 using an activity detection algorithm, e.g., FIG. 3. When activity is detected, the activity/inactivity output pin is set at a voltage level signaling activity. This pin can, for example, turn on a light 210. The system then searches for inactivity 220 using an inactivity detection algorithm, e.g., FIG. 4. When inactivity is detected, the activity/inactivity output pin is set at a voltage level signaling inactivity 230, turning off the light. The sensor management system then resumes searching for inactivity 200.

Figure 6:
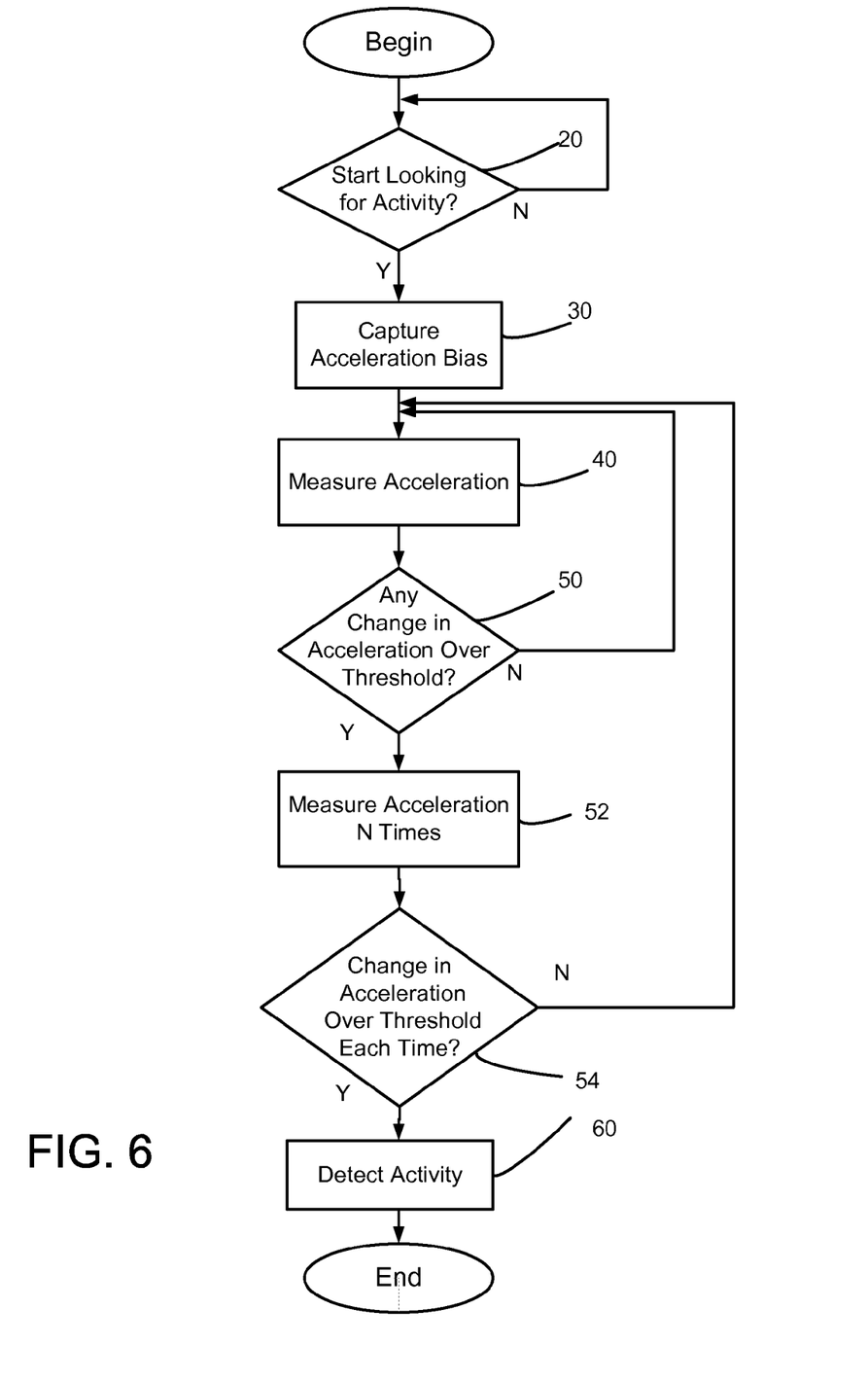
FIG. 6 shows a process of detecting activity with a MEMS accelerometer, according to another embodiment of the present invention.

In some embodiments of the invention, as shown in FIG. 6, activity detection is configured so that two or more successive detections of a change in acceleration exceeding an activity threshold are required before activity is determined to be detected. When an initial change in acceleration is detected 50, the acceleration measurement is repeated up to N times 52 and activity is declared detected 60 when a change in acceleration exceeding the activity threshold is detected in N successive measurements 54. This configuration can reduce activation of power draining functions when the movement of a device is only incidental. In further embodiments, the sensor management system 10 may generate an interrupt signal when activity is detected and when inactivity is detected. The system may clear the interrupt signal automatically after a timeout interval elapses.

Embodiments may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the method and system. Those skilled in the art should appreciate that such computer instructions may be written in a number of programming languages for use with many computer architectures or operating systems. For example, embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Thus, some embodiments of the invention may be implemented as hardware, software (e.g., a computer program product), or a combination of both software and hardware.

Although the above discussion discloses various exemplary embodiments of the invention, it should be apparent that those skilled in the art can make various modifications that will achieve some of the advantages of the invention without departing from the true scope of the invention. For example, intervals of time can be measured by counting a number of samples at a given sampling rate, as well as using a timer to provide a direct measurement of time. The scope of the invention includes all such embodiments as described in any appended claims.

What is claimed is:

1. A method for detecting activity and inactivity in a MEMS accelerometer, the method comprising:
   using circuitry to measure a dynamic component of acceleration;
   using circuitry to compare the dynamic component to an activity threshold to detect activity;
   using circuitry to detect inactivity once activity is detected, comprising:
   measuring a dynamic component of acceleration; and
   using circuitry to determine if the dynamic component of acceleration is less than an inactivity threshold and to determine if a predetermined period of time has elapsed to detect inactivity,
   wherein the accelerometer is implemented as an integrated circuit and wherein a pin of the integrated circuit is configured to present a first value when the last state detected is activity and to present a second value when the last state detected is inactivity, and
   wherein using circuitry to compare the dynamic component of acceleration to an activity threshold to detect activity determines if the dynamic component of acceleration exceeds the activity threshold at a plurality of intervals and only detects activity if the dynamic component of acceleration exceeds the threshold during each interval.

2. The method of claim 1 further comprising asserting an interrupt signal when an activity state is detected and asserting the interrupt signal when an inactivity state is detected and clearing the interrupt signal after a timeout interval.

3. The method of claim 1, wherein the MEMS accelerometer includes at least one measurement axis and measuring acceleration includes measuring acceleration from one or more measurement axes.

4. The method of claim 1, wherein the MEMS accelerometer includes at least one measurement axis and the activity threshold is a different value for two or more measurement axes.

5. The method of claim 1, wherein the MEMS accelerometer includes at least one measurement axis and the activity threshold is the same value for two or more measurement axes.

6. The method of claim 1, wherein the MEMS accelerometer includes one or more measurement axes and the activity is detected if the dynamic component of acceleration is greater than or equal to the threshold for any measurement axis.

7. A device for detecting activity and inactivity in a MEMS accelerometer, the device comprising:
   circuitry configured to measure a dynamic component of acceleration;
   circuitry configured to compare the dynamic component to an activity threshold to detect activity;
   circuitry configured to detect inactivity once activity is detected, comprising,
   circuitry configured to measure a dynamic component of acceleration; and
   circuitry configured to determine if the dynamic component of acceleration is less than an inactivity threshold and to determine if a predetermined period of time has elapsed to detect inactivity,
   wherein the device is implemented as an integrated circuit and wherein a pin of the integrated circuit is configured to present a first value when the last state detected is activity and to present a second value when the last state detected is inactivity, and
   wherein circuitry configured to compare the dynamic component of acceleration to an activity threshold to detect activity is configured to determine if the dynamic component of acceleration exceeds the threshold at a plurality of intervals and only detect activity if the dynamic component of acceleration exceeds the threshold during each interval.

8. The device of claim 7 wherein the device includes circuitry configured to assert an interrupt signal when an activity state is detected and to assert the interrupt signal when an inactivity state is detected and wherein the interrupt signal is cleared after a timeout interval.

9. A device for detecting activity in a MEMS accelerometer, the device comprising:
   circuitry configured to store a first acceleration value as measured by the accelerometer in a memory at a first time;
   circuitry configured to then measure a second acceleration value with the accelerometer at a predetermined time, the predetermined time later than the first time;
   circuitry configured to calculate a change in acceleration equal to the difference between the second acceleration value and the stored first acceleration value from the memory; and
   circuitry configured to compare the change in acceleration to a threshold to detect activity.

10. The device of claim 9, further comprising:
    circuitry configured to change the predetermined time for measuring acceleration when activity is detected.

11. The device of claim 9, wherein circuitry configured to compare the change in acceleration to a threshold to detect activity is configured to determine if the change in acceleration exceeds the threshold at a plurality of intervals and only detect activity if the change in acceleration exceeds the threshold during each interval.

12. The device of claim 9, wherein the MEMS accelerometer includes at least one measurement axis and the threshold is a different value for two or more measurement axes.

13. The device of claim 9, wherein the MEMS accelerometer includes one or more measurement axes and activity is detected if the change in acceleration is greater than or equal to the threshold for any measurement axis.

14. The device of claim 9, further including:
    circuitry configured to detect inactivity once activity is detected, comprising:
    circuitry configured to store an updated first acceleration value as measured by the accelerometer in the memory at a second time;
    circuitry configured to measure a third acceleration value using the accelerometer value at a second predetermined time, the second predetermined time later than the second time;
    circuitry configured to calculate a change in acceleration equal to the difference between the third acceleration value and the stored updated first acceleration value from the memory;

circuitry configured to compare the change in acceleration to an inactivity threshold;

circuitry configured to determine if the change in acceleration is less than the inactivity threshold; and circuitry configured to determine if the change in acceleration is less than the inactivity threshold and to determine if a predetermined period of time has elapsed to detect inactivity.

15. The device of claim 14, wherein the device is implemented as an integrated circuit and wherein a pin of the integrated circuit is configured to present a first value when the last state detected is activity and to present a second value when the last state detected is inactivity.

16. The device of claim 14, wherein the device includes circuitry configured to assert an interrupt signal when an activity state is detected and to assert the interrupt signal when an inactivity state is detected and wherein the interrupt signal is cleared after a timeout interval.

* * * * *